United States Patent Office 3,808,146
Patented Apr. 30, 1974

3,808,146
NEODYMIUM GLASS LASER HAVING AN OUTPUT AT 904 NM.
Charles C. Robinson and Robert R. Shaw, Sturbridge, Mass., assignors to American Optical Corporation, Southbridge, Mass.
Continuation-in-part of application Ser. No. 122,723, Mar. 10, 1971. This application Jan. 22, 1973, Ser. No. 321,997
Int. Cl. C03c 3/28; C09k 1/66
U.S. Cl. 252—301.4 R    1 Claim

ABSTRACT OF THE DISCLOSURE

A laserable glass material doped with a quantity of neodymium ions in a low concentration results in the glass exhibiting a ratio of fluorescent intensity peaked at 904 nanometers over the fluorescent intensity peaked at approximately 1060 nanometers of greater than 0.4 as measured by a Cary Model 14 spectrophotometer. The glass enables the generation of laser light in a waveband with an optical center at about 904 nanometers when positioned in a laser cavity which is resonant at 904 nanometers.

CROSS-REFERENCES TO RELATED APPLICATIONS

This application is a continuation-in-part of our copending application Ser. No. 122,723 filed Mar. 10, 1971, now Pat. No. 3,714,059, entitled "Neodymium Glass Laser Having Room Temperature Output at Wavelengths Shorter Than 1060 nm."

BACKGROUND OF THE INVENTION

For many applications it is considered desirable to have a laser device capable of producing an output of laser light energy at wavelengths of approximately 900 nonometers. The desirability of generating light at this wavelength is notable with systems utilizing detectors since there are detectors available which are extremely sensitive at this wavelength. Crystals exhibiting such emission are known. For example, a YAG crystal laser is described in an article entitled, "Oscillation and Doubling of the 0.946-$\mu$ Line in $Nd^{3+}$:YAG" which appeared in Applied Physics Letter, vol. 15, No. 4, Aug. 15, 1969, p. 111. A problem, however, with the YAG laser is that it is a crystal and thus does not possess the numerous advantages that are known to be attendant with glass lasers.

Glass has various characteristics which can make it an ideal laser host material. It can be made in large pieces of diffraction-limited optical quality, e.g., with an index refraction variation of less than one part per million across a 2.5-cm. diameter. In addition, glass lasers have been made in a variety of shapes and sizes from fibers a few microns wide supporting only a single dielectric waveguide mode, to rods 2 meters long or 7.5 cm. in diameter. Furthermore, pieces of glass with quite different optical properties can be fused to solve certain system design problems.

Glass composition can be tailored to give an index of refraction in the range of 1.5 to 2.0. Also, thermally stable laser cavities can be achieved by adjusting glass constituents to create an athermal laser glass.

There are two important differences between glass and crystal lasers. First, the thermal conductivity of glass is considerably lower than that of most crystal hosts. The second important difference between glass and crystal lasers is the inherently broader absorption and emission lines of ions in glass. These broader lines imply greater pump-light absorption, greater energy storage and much reduced spontaneous self-depletion for a given energy storage.

SUMMARY OF THE INVENTION

In accordance with the present invention a neodymium doped laser glass is provided which enables generation of laser radiation at about 904 nanometers.

Accordingly, it is an object of the present invention to provide new neodymium doped laser glass devices which generate laser light energy in waveband with an optical center at about 904 nanometers.

DESCRIPTION OF THE PREFERRED EMBODIMENTS

In accordance with the present invention, a laser device is provided which is comprised of a neodymium doped glass laser host positioned within an optically regenerative laser cavity. It has been found that trivalent neodymium ions in glass hosts typically have emission curves of the general shape shown in FIG. 1. This curve is provided at the outset to illustrate properties which are useful in carrying out the object of the present invention.

The fluorescence curves shown were measured in a Cary 14 spectrophotometer by placing the glass sample in a copper fixture which in turn was placed in the sample compartment of the Cary. The glass was irradiated at right angles with a xenon arc lamp through a filter which blocked the transmission of wavelengths longer than approximately 800 nm. The fluorescent spectrum was recorded using the automatic slit control which adjusted the slit width so that the output of a coiled tungsten filament lamp with a filament temperature of approximately 2800° K. produced a constant deflection on the recording chart for all wavelengths. Thus the recording chart must be corrected to obtain the true relative intensities by dividing the chart deflection by a factor proportional to the energy radiated by the tungsten lamp at the wavelengths of interest. We have estimated the correction factor for obtaining the ratio of the 940 nm. fluorescent intensity to the 1060 nm. intensity to be approximately unity. This estimate was made by using the tungsten emissivities measured by J. C. DeVos (J. C. DeVos, Physics 20,690 (1954)) for a ribbon filament tungsten lamp operating at 2800° K. in a calculation of the energy radiated by the coiled filament lamp at the two wavelengths of interest. The intensity ratios reported here were measured directly from the Cary charts using no correction factor.

Figure 1:
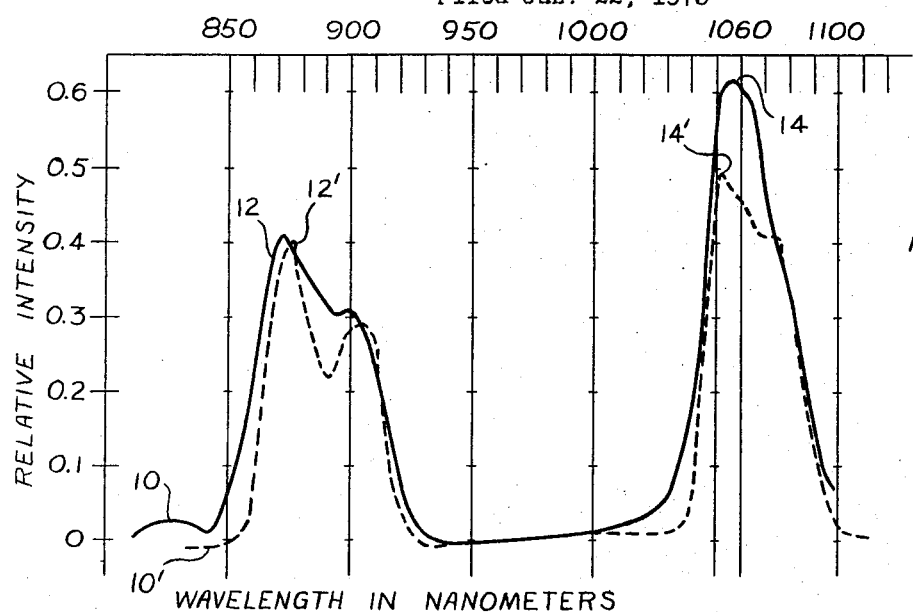
FIG. 1 is an emission curve showing the fluorescent emission properties of the glass utilized in laser devices of the present invention.

In FIG. 1 a curve 10 is shown with peaks 12 and 14 at 904 nanometers and 1060 nanometers respectively. Curve 10 was measured at room temperature, 300° K. A second curve 10' was measured 1.3° K. and has similar peaks 12' and 14'. In connection with these and similar peaks, it is to be understood that the actual range of useful fluorescent emission is somewhat broad. In fact, in accordance with the invention, peaks 12 and 12' can have a band width of 20 nanometers located between 890–910 nanometers, while peak 14 can have a width of 20 nanometers located between 1050–1070 nanometers. Although curve 10 shows other peaks, for purposes of the present invention the entire peaks represented by peaks 12/12' and 14/14' of curve 10 are the most critical. Tests have indicated that when a neodymium doped glass host is positioned in a cavity with reflectors that suppress emission at 1060 nanometers, peaks 12/12' and 14/14' are the only peaks that need be considered in evaluating whether the laser will emit at 1060 nm. or 904 nm. It has been determined that a ratio of peak intensities of at least .4 produces operative results at room temperature, that is, laser action at 904 nanometers at room temperature (20° C.), it is to be understood that in accordance with the invention the greater the magnitude of the foregoing ratio the more effective will be the host for producing the desired laser emission when positioned in the cavity of the present invention whether at room temperature or at a lower temperature.

As indicated above, in addition to considering the emission spectra of the host glass, consideration must also be given to the optically regenerative laser cavity into which the host glass is positioned. In accordance with the invention the reflectors forming the laser cavity must suppress laser emission at 1060 nanometers. It is to be understood that such reflectors are available and that the reflectors per se form no part of the present invention. For example, dichroic reflectors are available which transmit approximately 85% of the light at 1060 nanometers while reflecting approximately 99.7% of the light between the range of 800–1000 nanometers.

Figure 2:
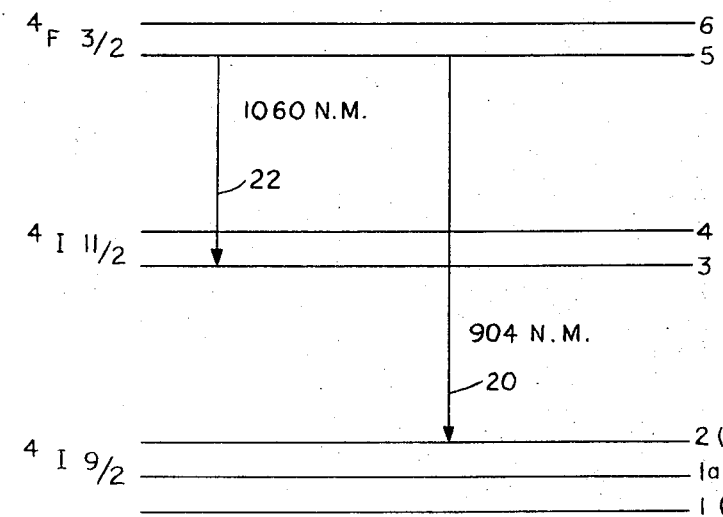
FIG. 2 is a schematic representation of the various energy levels in a $Nd^{3+}$ ion in the low soda borate glass of the present invention.

Although not intended to be restricted to a particular theory, an understanding of the energy level scheme including the $^4I_{9/2}$ manifold of the $Nd^{3+}$ ion is useful in explaining the present invention. In this regard, FIG. 2 is provided as a schematic representation of the various energy levels in a $Nd^{3+}$ ion.

A condition necessary for laser action according to this invention is that the population of the initial state be at least as large as the terminal state which requires, therefore, that the initial state population be at least 0.033 of the total population in the ground manifold ($^4I_{9/2}$).

The cavity losses for the 1060 nanometers emission must be higher than those for the 904 nanometers emission including the effect of the population in level 2.

In accordance with the invention, a laser glass has the composition in percent by weight as set forth in the following table.

| | |
|---|---|
| $Na_2O$ | 13.3 |
| $B_2O_3$ | 84.7 |
| $Nd_2O_3$ | 2.0 |

Figure 3:
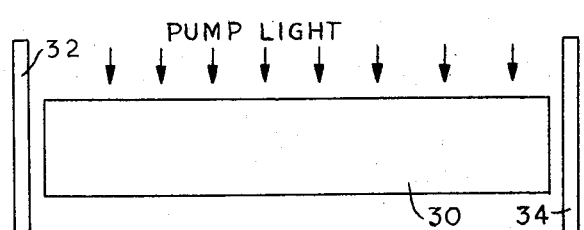
FIG. 3 is a diagrammatic illustration of a laser device of the present invention.

A rod 30 of the laser glass is positioned in an optically regenerative laser cavity formed by reflectors 32 and 34, as is shown in FIG. 3. The reflector 32 is 98% reflective for light at 904 nanometers and 98.4% reflective at 1060 nanometers. The second reflector 34 is 99.5% reflective at 904 nanometers and 15% reflective at 1060 nanometers. A pump light source is not shown in FIG. 3, it being understood that many pump sources are available which will produce the required population inversion in the neodymium ions. One such pump source commonly employed is a xenon flash tube. In this regard, the hardware for producing energy inversions are conventional and form no part of the present invention.

It can be seen by examining the curves of FIG. 1, that the ratio of intensity peaks 12/14, i.e. at room temperature, is approximately 0.5; while at 1.3K, the ratio 12'/14' is improved to 0.6.

Figure 4:
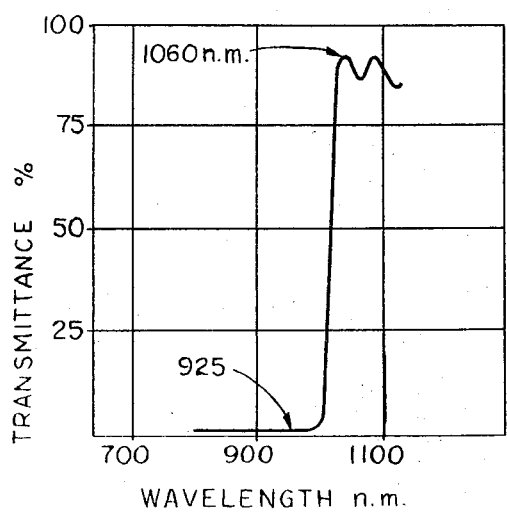
FIG. 4 is a transmittance and reflectance curve of a reflector useful in the laser device of the present invention.

The transmittance and reflectance curve of the type reflector used for reflector 34 is shown in FIG. 4 of the drawing. Such a reflector is available from Spectra-Physics, 1250 West Middlefield Road, Mountain View, Calif. 94040.

The laser glass, as set forth in the foregoing table, is preferably formed in the following manner. The components are added to the batch as $H_3BO_3$, $Na_2CO_3$, and $Nd_2O_3$. The constituents are added in the known stoichiometric amounts to yield a glass having a final composition as set forth in the foregoing table. The glass making raw materials must be of high purity and, in particular, must be free of contamination from iron or other elements which would cause light absorption at the desired laser emission wavelength if they were present in the finished glass. The finished glass, for example, should not contain more than 5 parts per million of iron as $Fe_2O_3$. The glass may be prepared by fusing the raw materials in a platinum crucible heated in a "Globar" electric furnace or an RF induction coil. No special atmosphere is necessary in the furnace. The raw materials are mixed intimately and as completely as possible in a mixing device that does not introduce any contamination. The mixed batch is located into a platinum crucible which will not contaminate the melt with undesirable impurities. The crucible should be raised to a temperature of approximately 1000° C. The batch is held at this temperature for approximately 15 minutes for a 50 gram sample. During this time, the melt is stirred with a platinum rod. The glass is then cast in a cast iron mold at room temperature. It is to be understood that larger batches require a different procedure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A fluorescent glass material which fluoresces at wavelengths with an optical center at approximately 904 nanometers and wavelengths with an optical center at approximately 1060 nanometers where the ratio of the relative fluorescent intensity peaked at approximately 904 nanometers over the relative fluorescent intensity peaked at approximately 1060 nanometers is at least .4 at room temperature, and where the material consists essentially of the following composition as given in weight percent

| | |
|---|---|
| $Na_2O$ | 13.3 |
| $B_2O_3$ | 84.7 |
| $Nd_2O_3$ | 2.0 |

References Cited

UNITED STATES PATENTS

| | | | |
|---|---|---|---|
| 3,254,031 | 5/1966 | DePaolis et al. | 252—301.4 R |
| 3,462,707 | 8/1969 | Pearson et al. | 252—301.4 R X |
| 3,714,059 | 1/1973 | Shaw et al. | 252—301.4 R X |
| 3,642,651 | 2/1972 | Marboe et al. | 252—301.4 R |
| 3,717,583 | 2/1973 | Shaw et al. | 252—301.4 R |

OTHER REFERENCES

Morey: "The Properties of Glass," Reinhold Publishng Co. (1957), p. 236.

EDWARD J. MEROS, Primary Examiner

J. COOPER, Assistant Examiner

U.S. Cl. X.R.

106—47 R

UNITED STATES PATENT OFFICE
CERTIFICATE OF CORRECTION

Patent No. 3,808,146          Dated   April 30, 1974

Inventor(s)  Charles C. Robinson and Robert R. Shaw

It is certified that error appears in the above-identified patent and that said Letters Patent are hereby corrected as shown below:

In column 1, at line 8, delete the numbers "321,997" and insert therefor --321,907--.

Signed and sealed this 10th day of September 1974.

(SEAL)
Attest:

McCOY M. GIBSON, JR.                C. MARSHALL DANN
Attesting Officer                   Commissioner of Patents